US012128823B2

(12) United States Patent
Kobayashi et al.

(10) Patent No.: US 12,128,823 B2
(45) Date of Patent: Oct. 29, 2024

(54) NOTIFICATION METHOD, APPARATUS AND PROGRAM (71) Applicant: NIPPON TELEGRAPH AND TELEPHONE CORPORATION, Tokyo (JP)

(72) Inventors: Kazunori Kobayashi, Tokyo (JP); Shin Murata, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/914,375

(22) PCT Filed: Mar. 30, 2020

(86) PCT No.: PCT/JP2020/014481
§ 371 (c)(1),
(2) Date: Sep. 26, 2022

(87) PCT Pub. No.: WO2021/199122
PCT Pub. Date: Oct. 7, 2021

(65) Prior Publication Data
US 2023/0115241 A1   Apr. 13, 2023

(51) Int. Cl.
*G08B 21/12* (2006.01)
*B60Q 9/00* (2006.01)
(Continued)

(52) U.S. Cl.
CPC .............. *B60Q 9/00* (2013.01); *G08B 21/02* (2013.01); *G08B 21/24* (2013.01)

(58) Field of Classification Search
USPC ... 340/540, 542, 545.1, 571, 588, 648, 5.31, 340/5.72, 309.16
See application file for complete search history.

(56) References Cited

U.S. PATENT DOCUMENTS 11,600,164 B2 * 3/2023 Morrison ............... B60N 2/002
2014/0253314 A1 * 9/2014 Rambadt ............... B60N 2/002
340/457.1

(Continued)

OTHER PUBLICATIONS

JAF Media Works It Media Department, Yuji Otsuki, (2019) ""Infant Unattended-leaving Detection System" Elimination of Heatstroke of People and Pets in Vehicle. "Automotive Engineering Exposition 2019" Valeo Version", [online], May 24, 2019, [searched on Mar. 10, 2020], the Internet <URL: https://jafmate.jp/blog/safety/190524-20-1.html> with English transldation generated by computer.

*Primary Examiner* — Daniel Previl (57) ABSTRACT

A notification method is a notification method of providing a notification of a warning indicating that an infant is left unattended in an automobile, the notification method including: a detection step of detecting, by a detection unit 1, whether the infant is left unattended; and a notification step of providing, by a notification unit 2, the notification of the warning when the infant is left unattended. The detection step includes detecting that the infant is left unattended when at least both of a case where a door used by a driver of the automobile is closed after being opened and a case where the driver is not in a driver's seat of the automobile are satisfied within a time frame and the infant is in the automobile.

4 Claims, 8 Drawing Sheets

(51) Int. Cl.
*G08B 21/02* (2006.01)
*G08B 21/24* (2006.01)

(56) References Cited

U.S. PATENT DOCUMENTS

| | | | |
|---|---|---|---|
| 2015/0262471 A1* | 9/2015 | Martin | G08B 21/24 |
| | | | 340/457 |
| 2017/0043714 A1* | 2/2017 | Lewis-Cheeks | G08B 21/22 |
| 2017/0116839 A1* | 4/2017 | Friedman | G08B 21/24 |
| 2017/0144595 A1* | 5/2017 | Rovinsky | B60Q 9/00 |
| 2017/0232887 A1* | 8/2017 | Clontz | G08B 21/22 |
| | | | 340/457 |
| 2018/0315292 A1* | 11/2018 | Pham | B60Q 9/00 |
| 2019/0139386 A1* | 5/2019 | Arinze | G08B 21/24 |
| 2020/0298782 A1* | 9/2020 | Zancanato | B60N 2/274 |
| 2020/0391693 A1* | 12/2020 | Kang | B60R 22/48 |
| 2021/0024032 A1* | 1/2021 | Edwards | B60R 22/48 |
| 2021/0129625 A1* | 5/2021 | Donboli | G08B 21/24 |
| 2021/0153478 A1* | 5/2021 | Mathew | G08B 21/22 |

* cited by examiner

NOTIFICATION METHOD, APPARATUS AND PROGRAM

CROSS-REFERENCE TO RELATED APPLICATIONS

This application is a U.S. National Stage Application filed under 35 U.S.C. § 371 claiming priority to International Patent Application No. PCT/JP2020/014481, filed on 30 Mar. 2020, the disclosure of which is hereby incorporated herein by reference in its entirety.

TECHNICAL FIELD

The present invention relates to a technology of providing a notification when an infant is left unattended in an automobile, for example.

BACKGROUND ART

A system in which a sensor is installed in an automobile and which issues an alarm to a user when an infant is left unattended in the automobile has been developed (for example, see Non-Patent Literature 1).

CITATION LIST

Non-Patent Literature

Non-Patent Literature 1: JAF MEDIA WORKS IT Media Department, Yuji Otsuki, ""Youji okizari kenchi shisutemu" hito ya petto no necchushou bokumetsu e. "Hito to kuruma no tekunoroji ten 2019" Valeo hen" ("Infant Unattended-leaving Detection System" Elimination of Heatstroke of People and Pets in Vehicle. "Automotive Engineering Exposition 2019" Valeo Version" (In Japanese)), [online], May 24, 2019, [searched on 2020, Mar. 10], the Internet <URL: https://jafmate.jp/blog/safety/190524-20-1.html>

SUMMARY OF THE INVENTION

Technical Problem

However, the kind of condition under which it is to be determined whether a warning is to be issued is still under consideration.

An object of the present invention is to provide a notification method, a notification device, and a notification program that provide a notification of a warning under an appropriate situation.

Means for Solving the Problem

A notification method according to one aspect of the present invention is a notification method of providing a notification of a warning indicating that an infant is left unattended in an automobile, the notification method including: a detection step of detecting, by a detection unit, whether the infant is left unattended; and a notification step of providing, by a notification unit, the notification of the warning when the infant is left unattended. In the notification method, the detection step includes detecting that the infant is left unattended when at least both of a case where a door used by a driver of the automobile is closed after being opened and a case where the driver is not in a driver's seat of the automobile are satisfied within a time frame and the infant is in the automobile.

Effects of the Invention

The notification of the warning can be provided in the appropriate situation.

DESCRIPTION OF EMBODIMENTS

Embodiments of the present invention are described in detail below. In the drawings, configuration units having the same functions are denoted by the same characters, and overlapping description is omitted.

First Embodiment

Figure 1:
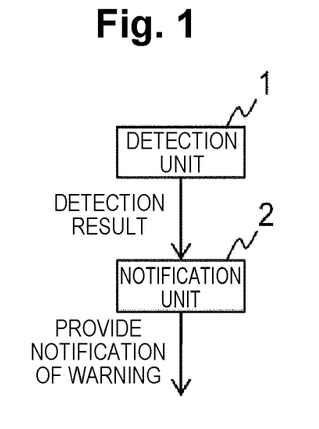
FIG. 1 is a diagram illustrating an example of a functional configuration of a notification device.

A notification device of a first embodiment includes, for example, a detection unit 1 and a notification unit 2 as illustrated in FIG. 1.

Figure 2:
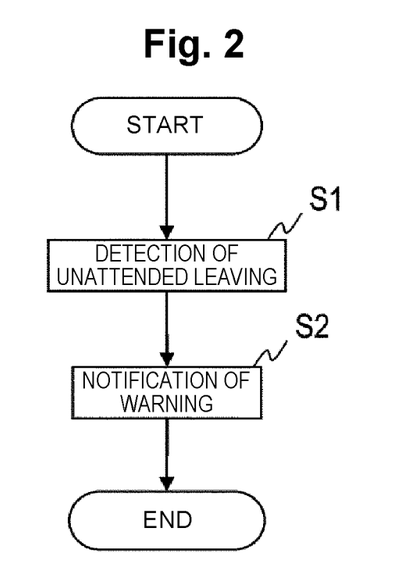
FIG. 2 is a diagram illustrating an example of a processing procedure of a notification method.
Figure 3:
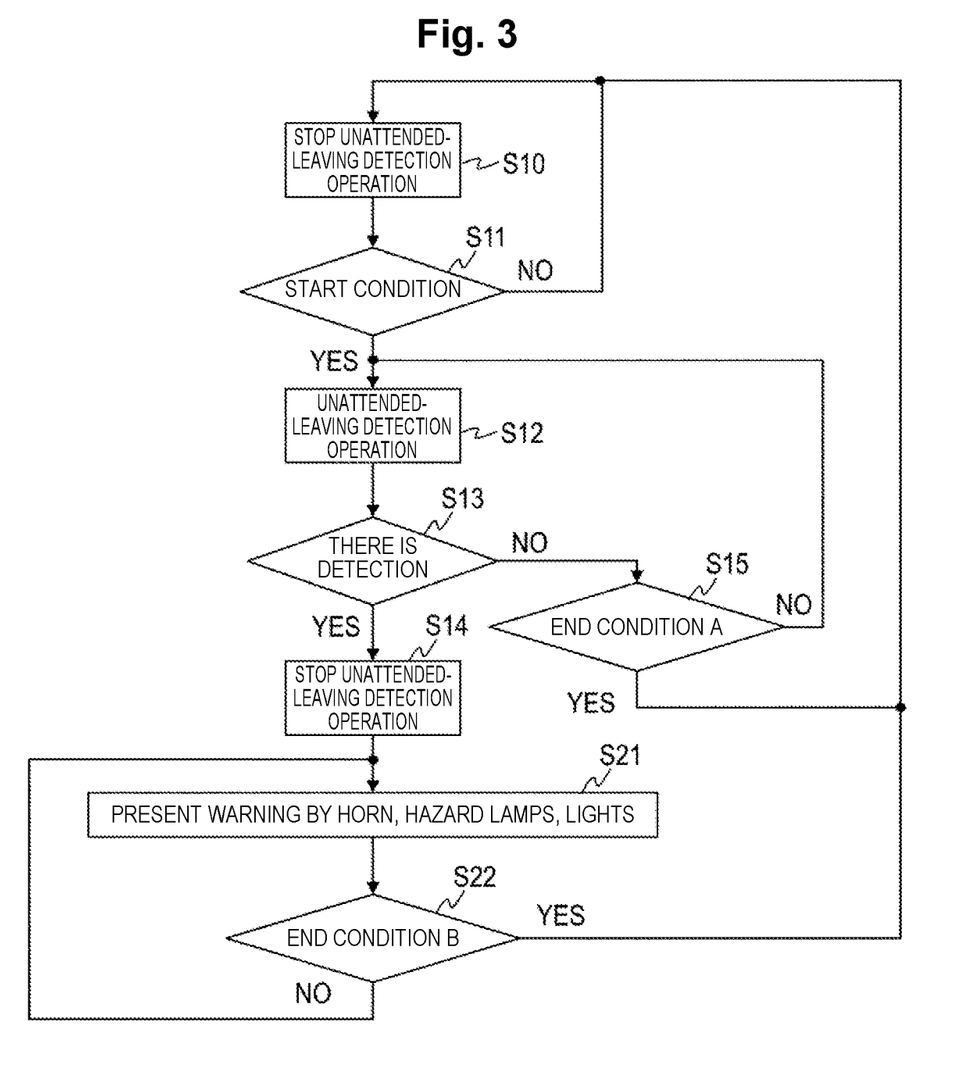
FIG. 3 is a diagram illustrating an example of a processing procedure of a notification method of a first embodiment.

A notification method of the first embodiment is realized, for example, when each unit of the notification device performs processing of Step S1 to Step S2 described below and illustrated in FIG. 2 and FIG. 3.

Each unit of the notification device of the first embodiment is described below.

[[Detection Unit 1]]

The detection unit 1 detects whether an infant is left unattended (Step S1). The expression of "an infant is left unattended" means that a driver has got out of an automobile and the infant is in the vehicle. It can be determined that the driver has got off the automobile when at least both of a case where a door used by the driver of the automobile is closed after being opened and a case where the driver is not in a driver's seat of the automobile are satisfied within a time frame. Therefore, for example, the detection unit 1 determines that an infant is left unattended when at least both of a case where the door used by the driver of the automobile is closed after being opened and a case where the driver is not in the driver's seat of the automobile are satisfied within a time frame and there is an infant in the automobile. As a result, a notification of a warning can be provided in an appropriate situation.

An example of processing of the detection unit 1 is described below. In this example, the processing in Step S1 includes processing of Step S10 to Step S15 described below and illustrated in FIG. 3.

First, the detection unit 1 performs processing of stopping an unattended-leaving detection operation before performing the processing of Step S11 (Step S10). When the unattended-leaving detection operation is already stopped, the detection unit 1 does not perform anything as the processing of stopping the unattended-leaving detection operation.

Then, the detection unit 1 determines whether a start condition is satisfied (Step S11).

Example 1 and Example 2 of the start condition are described below. The start condition is, for example, Example 1 or Example 2 of the start condition.

Example 1 of Start Condition

Example 1 of the disclosure condition is the satisfaction of at least both of a case where the door used by the driver of the automobile is closed after being opened and a case where the driver is not in the driver's seat of the automobile within a time frame.

Whether the driver is in the driver's seat can be determined by image recognition or a weight sensor and the like disposed under the seat, for example. As the image recognition, for example, an approach described in Japanese Patent Laid-Open. No. 2014-102746 can be used.

Example 2 of Start Condition

Example 2 of the start condition is the satisfaction of a condition that an engine of the automobile be stopped in addition to Example 1 of the start condition.

In other words, Example 2 of the disclosure condition is the satisfaction of all of a case where the door used by the driver of the automobile is closed after being opened, a case where the driver is not in the driver's seat of the automobile, and a case where the engine of the automobile is stopped within a time frame.

As indicated in Example 1 and Example 2 of the start condition, the start condition may be that at least satisfy both of a case where the door used by the driver of the automobile is closed after being opened and a case where the driver is not in the driver's seat of the automobile, within a time frame.

When the start condition is not satisfied, the processing returns to processing of Step S10.

When the start condition is satisfied, the detection unit 1 detects the unattended leaving (Step S13) by performing the unattended-leaving detection operation (Step S12).

Example 1 to Example 3 of the unattended-leaving detection operation performed by the detection unit 1 are described below.

Example 1 of Unattended-leaving Detection Operation

A signal of the sound generated in the automobile is input to the detection unit 1. The signal of the sound is acquired by a microphone installed in the automobile, for example.

In this case, the detection unit 1 determines whether a cry, a moan, or a scream is included in the input signal of the sound, and detects the unattended leaving when a cry, a moan, or a scream is included.

Example 2 of Leave-alone Detection Operation

An image of the inside of the automobile is input to the detection unit 1. The image is acquired by a camera installed in the automobile, for example.

In this case, the detection unit 1 detects the unattended leaving on the basis of the input image.

Example 3 of Unattended-leaving Detection Operation

Information relating to vital signs in the automobile is input to the detection unit 1. The information relating to the vital signs is acquired by a radio wave radar installed in the automobile, for example.

In this case, the detection unit 1 determines whether there are signs of a living body in the automobile on the basis of the input information relating to the vital signs and detects the unattended leaving when there are signs of a living body.

In Step S13, when the unattended leaving is detected, the detection unit 1 stops the unattended-leaving detection operation (Step S14). When the unattended leaving is not detected, the detection unit 1 determines whether an end condition A is satisfied (Step S15). When the end condition A is satisfied, the processing returns to the processing of Step S10. When the end condition A is not satisfied, the processing returns to processing of Step S12.

Example 1 and Example 2 of the end condition A are described below.

Example 1 of End Condition A

Example 1 of the end condition A is the elapse of a certain amount of time.

Example 2 of End Condition A

Example 2 of the end condition A is the presence of the driver in the driver's seat of the automobile.

[[Notification Unit 2]]

The notification unit 2 provides a notification of a warning when an infant is left unattended (Step S2).

An example of processing of the notification unit 2 is described below. In this example, the processing in Step S2 includes processing of Step S21 to Step S22 described below and illustrated in FIG. 3.

The notification unit 2 provides a notification of a warning by a horn, hazard lamps, lights, and the like (Step S21).

The notification unit 2 determines whether the end condition B is satisfied (Step S22). When the end condition B is satisfied, the processing returns to the processing of Step S10. When the end condition B is not satisfied, the processing returns to the processing of Step S21.

As above, the notification unit 2 repeatedly performs the processing of Step S21 until the end condition B is satisfied, for example.

Example 1 to Example 3 of the end condition B are described below.

Example 1 of End Condition B

Example 1 of the end condition B is the opening of the door of the automobile.

Example 2 of End Condition B

Example 2 of the end condition B is an elapse of a certain amount of time.

Example 3 of End Condition B

Example 3 of the end condition B is the falling of the remaining battery charge of the automobile below a predetermined threshold value. For example, when the air conditioning control and the notification of an alarm of the automobile cannot be performed, it can be determined that the remaining battery charge of the automobile falls below the predetermined threshold value.

The end condition B may be at least one condition of Example 1 to Example 3 of the end condition B. In other words, the notification unit 2 may determine that the end condition B is satisfied when at least one condition of Example 1 to Example 3 of the end condition B is satisfied.

Second Embodiment

A notification device and a notification method of the second embodiment provide a notification of a warning by a call.

As with the notification device of the first embodiment, the notification device of the second embodiment includes, for example, the detection unit 1 and the notification unit 2 as illustrated in FIG. 1.

Figure 4:
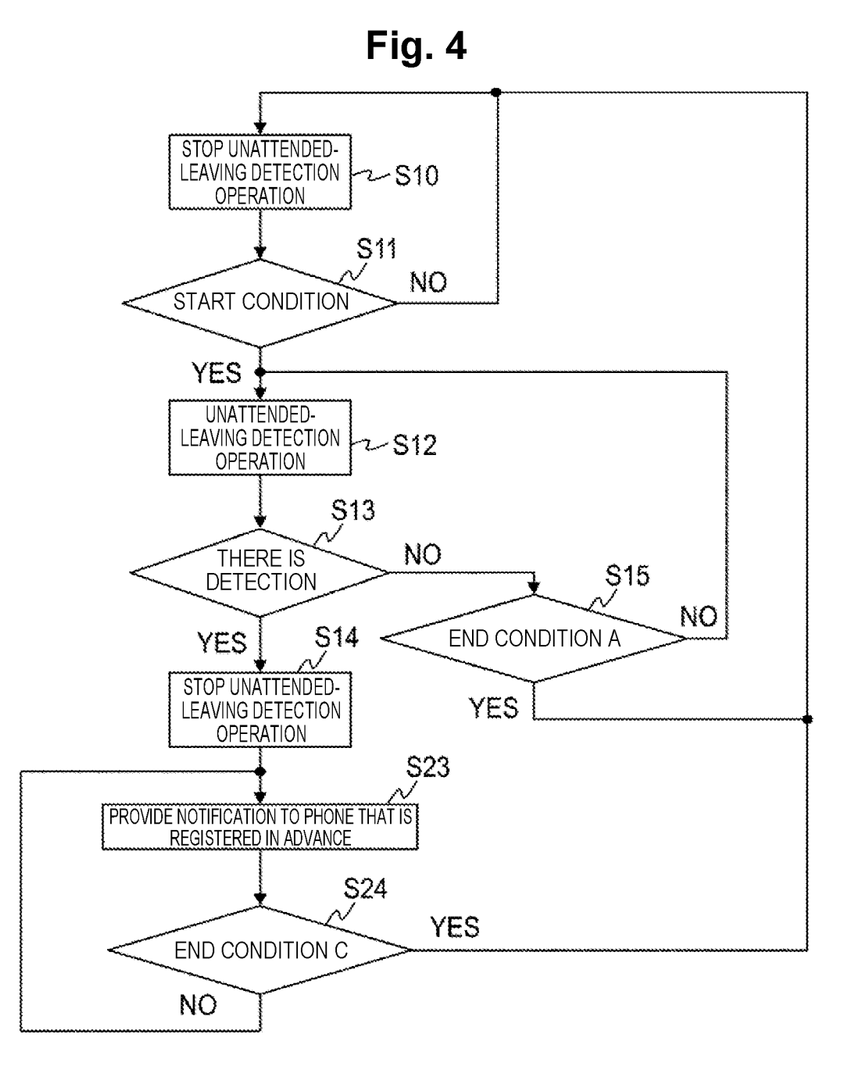
FIG. 4 is a diagram illustrating an example of a processing procedure of a notification method of a second embodiment.

The notification method of the second embodiment is realized, for example, when each unit of the notification device performs processing of Step S1 to Step S2 described below and illustrated in FIG. 2 and FIG. 4.

Processing of the notification unit 2 that is a part different from that of the first embodiment is mainly described below. The processing of the detection unit 1 is similar to that of the first embodiment, and hence description thereof is omitted.

In the second embodiment, the processing of Step S2 includes processing of Step S23 to Step S24 described below and illustrated in FIG. 4.

After Step S14, the notification unit 2 provides a notification of a warning by calling a phone number that is registered in advance, for example (Step S23). The target of the notification of the warning is the driver or an owner of the automobile, for example.

The notification unit 2 determines whether an end condition C is satisfied (Step S24). When the end condition C is satisfied, the processing returns to the processing of Step S10. When the end condition C is not satisfied, the processing returns to the processing of Step S23.

As above, the notification unit 2 repeatedly performs the processing of Step S23 until the end condition C is satisfied, for example.

An example of the end condition C is the connection of a call and the transmission of an exit code from the other party of the call in a DTMF.

Third Embodiment

A notification device and a notification method of the third embodiment may notify an emergency call center after providing a notification of a warning by a call.

As with the notification devices of the first embodiment and the second embodiment, the notification device of the third embodiment includes, for example, the detection unit 1 and the notification unit 2 as illustrated in FIG. 1.

Figure 5:
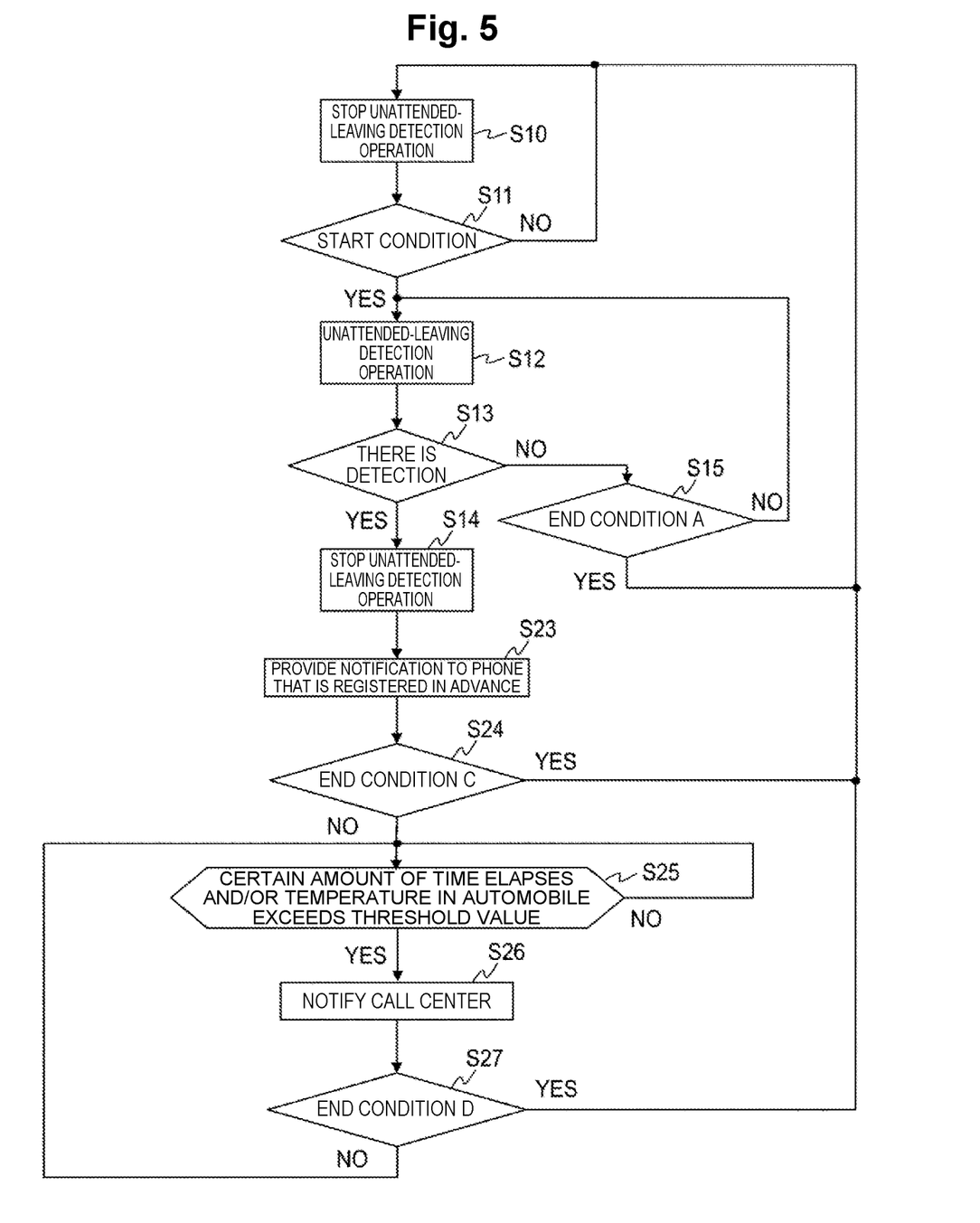
FIG. 5 is a diagram illustrating an example of a processing procedure of a notification method of a third embodiment.

The notification method of the third embodiment is realized, for example, when each unit of the notification device performs processing of Step S1 to Step S2 described below and illustrated in FIG. 2 and FIG. 5.

In the third embodiment, the processing of Step S2 includes processing of Step S23 to Step S27 described below and illustrated in FIG. 5.

The processing of Step S25 to Step S27 of the notification unit 2 that is a part different from that of the second embodiment is mainly described below. Other processing is similar to the processing of the first embodiment and the second embodiment, and hence description thereof is omitted.

When it is determined that the end condition C is not satisfied in Step S24, the notification unit 2 determines whether a danger condition is satisfied (Step S25).

Example 1 to Example 3 of the danger condition are described below.

Example 1 of Danger Condition

Example 1 of the danger condition is an elapse of a certain amount of time.

Example 2 of Danger Condition

Example 2 of the danger condition is the excess of the temperature in the automobile over a preset threshold value. An example of the preset threshold value is 25 degrees, 28 degrees, or 31 degrees.

Example 3 of Danger Condition

Example 3 of the danger condition is the satisfaction of both conditions, that is, Example 1 and Example 2 of the danger condition. In other words, Example 3 of the danger condition is an elapse of a certain amount of time and the excess of the temperature in the automobile over a preset threshold value.

As indicated by Example 1 to Example 3 of the danger condition, the danger condition is, for example, the satisfaction of one or both of the condition that a certain amount of time elapse and the condition that the temperature in the automobile exceed a preset threshold value.

When it is determined that the danger condition is not satisfied, the processing returns to processing of Step S25. In other words, the processing of Step S25 is performed until the danger condition is satisfied.

When it is determined that the danger condition is satisfied, the notification unit 2 notifies the emergency call center of a warning by a call, for example (Step S26).

The notification unit 2 determines whether an end condition D is satisfied (Step S27). When the end condition D is satisfied, the processing returns to the processing of Step S10. When the end condition D is not satisfied, the processing returns to the processing of Step S25.

As above, the notification unit 2 repeatedly performs the processing of Step S25 until the end condition D is satisfied, for example.

Example 1 and Example 2 of the end condition D are described below.

Example 1 of End Condition D

Example 1 of the end condition D is the connection of a call and the disconnection of the call thereafter.

Example 2 of End Condition D

Example 2 of the end condition D is the connection of a call and the transmission of an exit code from the other party of the call in a DTMF.

Fourth Embodiment

A notification device and a notification method of the fourth embodiment may notify an emergency call center after providing a notification by an alarm in the vehicle and then providing a notification of a warning by a call.

As with the notification devices of the first embodiment to the third embodiment, the notification device of the fourth embodiment includes, for example, the detection unit 1 and the notification unit 2 as illustrated in FIG. 1.

Figure 6:
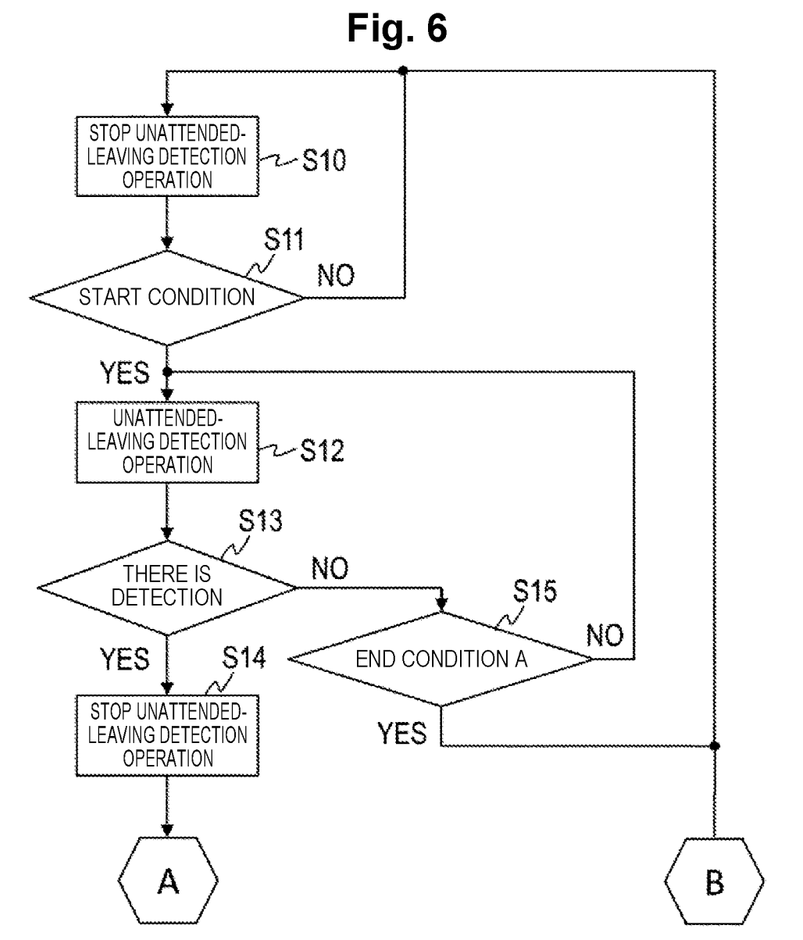
FIG. 6 is a diagram illustrating an example of a processing procedure of notification methods of a fourth embodiment and a fifth embodiment.
Figure 7:
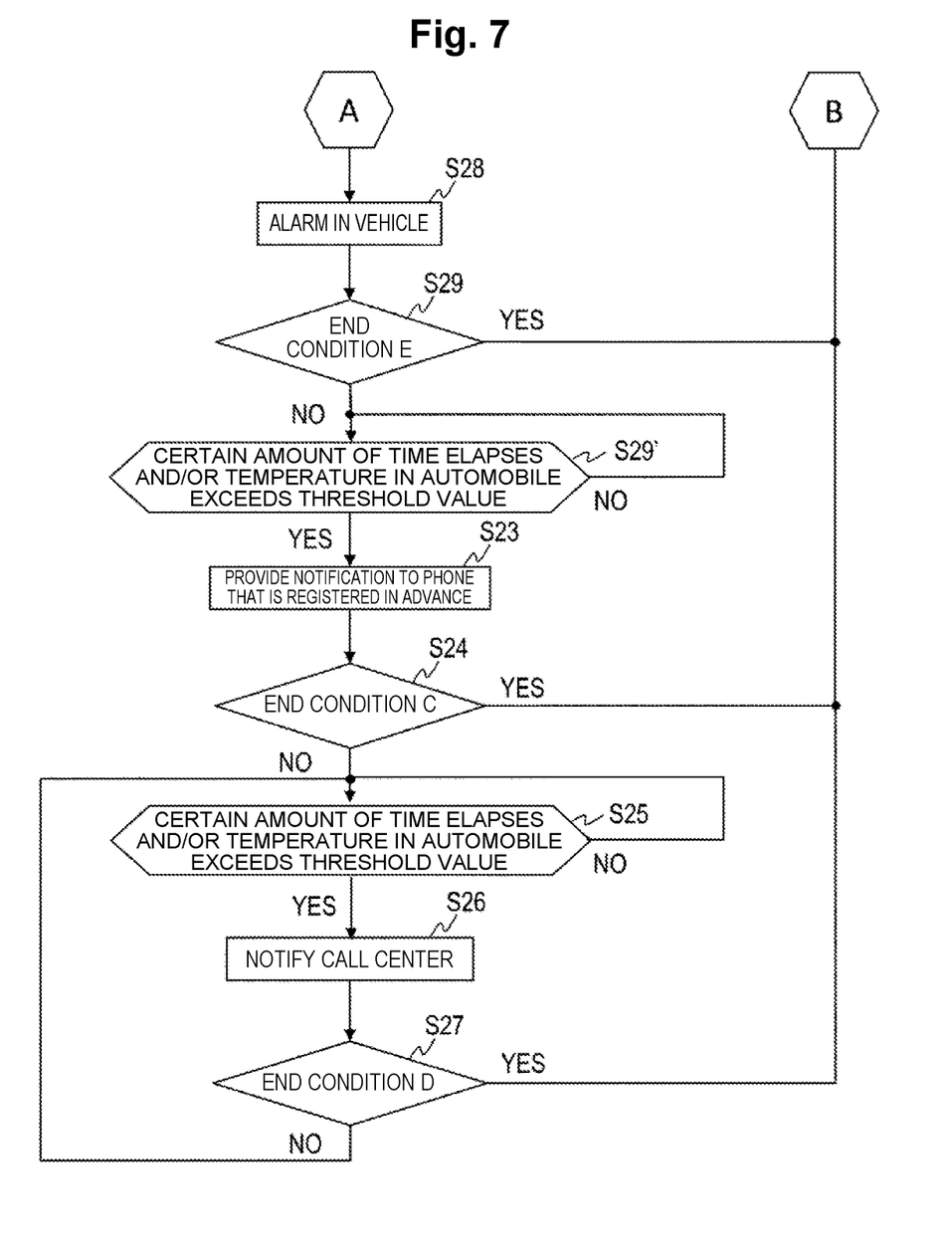
FIG. 7 is a diagram illustrating an example of a processing procedure of the notification method of the fourth embodiment.

The notification method of the fourth embodiment is realized, for example, when each unit of the notification device performs processing of Step S1 to Step S2 described below and illustrated in FIG. 2, FIG. 6, and FIG. 7. FIG. 6 and FIG. 7 are flowcharts illustrating an example of processing of the notification method of the fourth embodiment. A hexagon A in FIG. 6 is connected to a hexagon A in FIG. 7, and a hexagon B in FIG. 6 is connected to a hexagon B in FIG. 7.

In the fourth embodiment, the processing of Step S2 includes the processing of Step S28, Step S29, and Step S23 to Step S27 described below and illustrated in FIG. 7.

The processing of Step S28 to Step S29' of the notification unit 2 that is a part different from that of the first embodiment to the third embodiment is mainly described below. Other processing is similar to the processing of the first embodiment to the third embodiment, and hence description thereof is omitted.

After the unattended-leaving detection operation is stopped in Step S14, the notification unit 2 provides a notification of a warning by providing a notification of an alarm in the vehicle (Step S28). Examples of the alarm in the vehicle include a lamp of an interior light and a buzzer.

The notification unit 2 determines whether an end condition E is satisfied (Step S29). When the end condition E is satisfied, the processing returns to the processing of Step S10.

Example 1 and Example 2 of the end condition E are described below.

Example 1 of End Condition E

Example 1 of the end condition E is the opening of the door of the automobile.

Example 2 of End Condition E

Example 2 of the end condition E is the pressing down of a button for canceling the alarm.

When it is determined that the end condition E is not satisfied in Step S29, the notification unit 2 determines whether a danger condition is satisfied (Step S29'). The processing and the danger condition of Step S29' are similar to the processing and the danger condition of Step S25. When it is determined that the danger condition is not satisfied in Step S29', the processing returns to processing of Step S10.

When it is determined that the danger condition is satisfied in Step S29', the processing of Step S23 and thereafter is performed as with the third embodiment.

Fifth Embodiment

A notification device and a notification method of the fifth embodiment may notify an emergency call center after providing a notification by an alarm in the vehicle, providing a notification by an alarm on the outside of the vehicle thereafter, and then providing a notification of a warning by a call.

There is a possibility of a false alarm, and hence notifications with which more trouble is caused by a false alarm are performed later in the abovementioned order. An example of such false alarm is alarm for a case where an adult is on board, which alarm, upon the alarm sounding in the vehicle, can be canceled using a cancel button.

As with the notification devices of the first embodiment to the fourth embodiment, the notification device of the fifth embodiment includes, for example, the detection unit 1 and the notification unit 2 as illustrated in FIG. 1.

Figure 8:
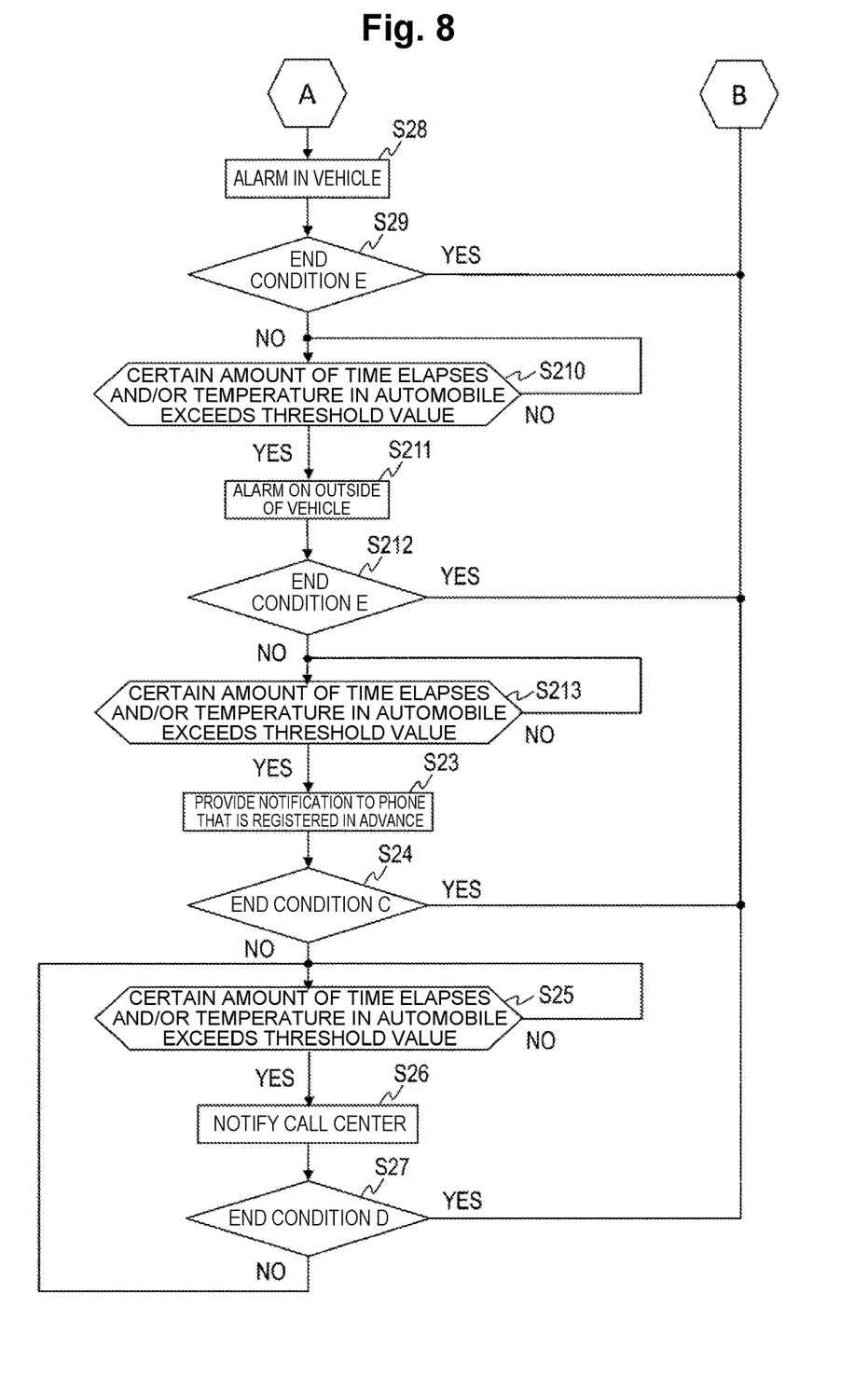
FIG. 8 is a diagram illustrating an example of a processing procedure of the notification method of the fifth embodiment.

The notification method of the fifth embodiment is realized, for example, when each unit of the notification device performs processing of Step S1 to Step S2 described below and illustrated in FIG. 2, FIG. 6, and FIG. 8. FIG. 6 and FIG. 8 are flowcharts illustrating an example of processing of the notification method of the fifth embodiment. The hexagon A in FIG. 6 is connected to the hexagon A in FIG. 8, and the hexagon B in FIG. 6 is connected to the hexagon B in FIG. 8.

In the fifth embodiment, the processing of Step S2 includes the processing of Step S28 to Step S213 and Step S23 to Step S27 described below and illustrated in FIG. 8.

Processing of the notification unit 2 that is a part different from that of the first embodiment to the fourth embodiment is mainly described below. Other processing is similar to the processing of the first embodiment to the fourth embodiment, and hence description thereof is omitted.

The notification unit 2 performs the processing of Step S28 and Step S29 as with the fourth embodiment.

When it is determined that the end condition E is not satisfied in Step S29, the notification unit 2 determines whether a danger condition is satisfied (Step S210). The processing and the danger condition of Step S210 are similar to the processing and the danger condition of Step S25. When it is determined that the danger condition is not satisfied in Step S210, the processing returns to processing of Step S10.

When it is determined that the danger condition is satisfied in Step S210, the notification unit 2, for example, provides a notification of a warning by providing a notification of an alarm on the outside of the vehicle (Step S211). Examples of the alarm on the outside of the vehicle include a horn, hazard lamps, and lights.

The notification unit 2 determines whether an end condition E is satisfied (Step S212). The processing and the end condition E of Step S212 are similar to the processing and the end condition E of Step S29. When it is determined that the end condition E is satisfied in Step S212, the processing returns to processing of Step S10.

When it is determined that the end condition E is not satisfied in Step S212, the notification unit 2 determines whether a danger condition is satisfied (Step S213). The processing and the danger condition of Step S213 are similar to the processing and the danger condition of Step S25. When it is determined that the danger condition is not satisfied in Step S213, the processing returns to processing of Step S10.

When it is determined that the danger condition is satisfied in Step S213, the processing of Step S23 and thereafter is performed as with the third embodiment.

Description Common to Third Embodiment to Fifth Embodiment

In Step S2 that is the notification step in the third embodiment to the fifth embodiment, when a predetermined action is not detected after the provision of the notification of the warning by a certain method and a predetermined danger condition is satisfied, the notification of the warning is provided by a method different from the certain method. In other words, the notification unit 2 provides, when a predetermined action is not detected after the provision of the notification of the warning by a certain method and a predetermined danger condition is satisfied, the notification of the warning by a method different from the certain method.

The expression of "a method different from a certain method" is a warning notification method that is severer than "a certain method", for example. As above, action can be taken more reliably by gradually causing the notification method to be more severe in accordance with the seriousness of the situation.

As above, false alarms to the emergency call center and the like can be reduced by notifying the emergency call center of the warning by a call only when the danger condition is satisfied.

The predetermined danger condition is any of Example 1 to Example 3 of the danger condition. In other words, the predetermined danger condition is the satisfaction of one or both of the condition that a certain amount of time elapse and the condition that the temperature in the automobile exceed a preset threshold value.

Modified Example

Embodiments of the present invention have been described above, but specific configurations are not limited to those embodiments, and it goes without saying that, even when changes and the like of design are made, as appropriate, without departing from the gist of the present invention, the changes and the like are included in the present invention.

For example, the exchange of data between configuration units of the notification device may be directly performed or may be performed via a storage unit (not shown).

In the first embodiment to the fifth embodiment, the notification of a warning is provided by four types of methods, that is, (1) the alarm in the vehicle, (2) the alarm on the outside of the vehicle, (3) a call to the user, and (4) a call to a call center, for example, but (1) to (4) above may be independently used or may be used by a combination of two or more thereof. In other words, the first embodiment to the fifth embodiment are merely examples, and the notification of a warning may be provided by at least one method of (1) to (4) above.

The detection of an infant that is left unattended is one example of an application of the present invention. The present invention may be applied to an event that has occurred in the automobile for which an alert is to be issued to the user such as vandalism, for example. In this case, the event is detected with use of a sensor such as a vibration sensor and a position sensor.

Various processing described in the embodiments is not only executed in chronological order in accordance with the order of description and may be executed in parallel or individually in accordance with the processing capability of the device that executes the processing or as needed.

[Program and Recording Medium]

Figure 9:
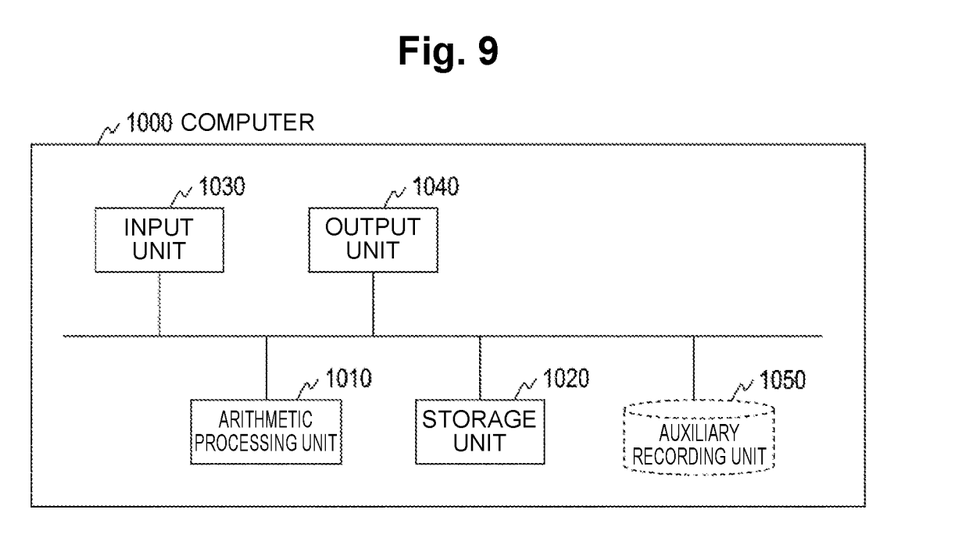
FIG. 9 is a diagram illustrating a functional configuration example of a computer.

The processing of each unit of each device described above may be realized by a computer. In this case, the processing content of the function to be included in each device is described by a program. The program is caused to be read by a storage unit 1020 of a computer illustrated in FIG. 9, and is operated by an arithmetic processing unit 1010, an input unit 1030, an output unit 1040, and the like. As a result, various processing functions in each of the devices described above are realized on the computer.

The program in which the processing content is described can be recorded in a recording medium readable by the computer. The recording medium readable by the computer is a non-transitory recording medium, for example, and specifically is a magnetic recording device, an optical disc, and the like.

The distribution of the program is performed, for example, by selling, transferring, and lending, for example, a portable recording medium such as a DVD, a CD-ROM, and the like in which the program is recorded. The program may be stored in a storage device of a server computer, and the program may be distributed by transmitting the program to another computer from the server computer over a network.

The computer that executes the program as above temporarily stores the program recorded on the portable recording medium or the program transmitted from the server computer into an auxiliary recording unit 1050 that is a non-transitory storage device of itself first, for example. When the processing is executed, the computer reads the program stored in the auxiliary recording unit 1050 that is the non-transitory storage device of itself into a storage unit 1020 and executes processing in accordance with the read program. As another execution form of the program, the computer may directly read the program into the storage unit 1020 from the portable recording medium and execute processing in accordance with the program. Further, each time a program is transmitted to the computer from the server computer, the computer may successively execute processing in accordance with the received program. The abovementioned processing may be executed by a so-called application service provider (ASP) service in which the program transmission from the server computer to the computer is not performed and the processing function is realized by only the execution instruction and result acquisition thereof. The program of the present form includes information (data and the like having a nature of specifying the processing of a computer but is not a direct instruction for the computer) which is provided for processing performed by an electronic computer and which is equivalent to a program.

In the present form, the present device is configured by executing a program on a computer. However, at least a part of the processing content may be realized in a hardware-like manner.

Other than the above, it goes without saying that changes can be made, as appropriate, without departing from the gist of the present invention.

The invention claimed is:

1. A notification method of providing a notification of a warning indicating that an infant is left unattended in an automobile, the notification method comprising:
a detection step of detecting whether the infant is left unattended; and a notification step of providing an instance of the notification of the warning when the infant is left unattended,
wherein the detection step includes detecting that the infant is left unattended when at least both of a first case and a second case occur within a time frame and when the infant is in the automobile, wherein the first case is where a door used by a driver of the automobile is closed after being opened, and wherein the second case is where the driver is not in a driver's seat of the automobile, and
wherein the notification step further comprises, when a predetermined action is not detected after the provision of the instance of the notification of the warning using a first type of communication and further when satisfying both of a first condition that a predetermined amount of time has elapsed since the provision of the instance of the notification of the warning and a second condition that a temperature inside the automobile exceeds a preset threshold value, providing another instance of the notification of the warning using a second type of communication, and the second type of communication conveys the warning as a more severe condition than the first type of communication conveys.

2. A non-transitory computer readable medium that stores a program for causing a computer to execute each step of the notification method according to claim 1.

3. The notification method according to claim 1, wherein the first type of communication is without generating a call to an emergency call center, and the second type of communication comprises the call to the emergency call center.

4. A notification device that provides a notification of a warning indicating that an infant is left unattended in an automobile, the notification device comprising processing circuitry configured to:
detect whether the infant is left unattended; and
provide an instance of the notification of the warning when the infant is left unattended,
wherein the processing circuitry configured to detect that the infant is left unattended when at least both of a first case and a second case occur within a time frame and when the infant is in the automobile, wherein the first case is where a door used by a driver of the automobile is closed after being opened, and wherein the second case is where the driver is not in a driver's seat of the automobile, and
wherein the notification step further comprises, when a predetermined action is not detected after the provision of the instance of the notification of the warning using a first type of communication and further when satisfying both of a first condition that a predetermined amount of time has elapsed since the provision of the instance of the notification of the warning and a second condition that a temperature inside the automobile exceeds a preset threshold value, providing another instance of the notification of the warning using a second type of communication, and the second type of communication conveys the warning as a more severe condition than the first type of communication conveys.

* * * * *